United States Patent [19]
Dudley

[11] 3,940,676
[45] Feb. 24, 1976

[54] DAMPING CONTROL FOR POSITIONING APPARATUS

[75] Inventor: Tex Monroe Dudley, Palo Alto, Calif.

[73] Assignee: Electroglas, Inc., Santa Clara, Calif.

[22] Filed: Oct. 11, 1974

[21] Appl. No.: 513,966

[52] U.S. Cl. .................. 318/612; 318/687; 318/38; 318/135; 318/210
[51] Int. Cl.[2] ..................... G05B 5/01; H02K 41/02
[58] Field of Search .......... 318/611, 612, 614, 615, 318/629, 685, 696, 135, 687, 38, 197, 204, 209, 210

[56] References Cited
UNITED STATES PATENTS

| | | | |
|---|---|---|---|
| 3,376,578 | 4/1968 | Sawyer | 318/135 |
| 3,385,984 | 5/1968 | O'Regan | 318/696 |
| 3,735,231 | 5/1973 | Sawyer | 318/687 |
| 3,746,959 | 7/1973 | Kobayashi et al. | 318/696 |
| 3,836,835 | 9/1974 | Sawyer | 318/687 |

*Primary Examiner*—Robert K. Schaefer
*Assistant Examiner*—John J. Feldhaus
*Attorney, Agent, or Firm*—Ellsworth R. Roston

[57] ABSTRACT

A positioning apparatus includes a platen and a head independently movable relative to the platen. First and second coils having a particular phase relationship are disposed relative to each other on the head are independently energized to produce first and second electromagnetic forces. These electromagnetic forces have varying characteristics for moving the head relative to the platen and constant characteristics for maintaining the head in a substantially fixed relationship to the platen. Abrupt changes from the variable to the constant characteristics of the applied electromotive forces allow inertial forces to impart a decaying oscillation of the head about the positional origin determined by the constant characteristics of the applied electromotive force.

Oscillation of the head relative to the platen produces first and second back-electromotive force sinusoids in the first and second coils, respectively. Means is provided for detecting the first back-electromotive force sinusoid to produce a damping signal with characteristics similar to the characteristics of the second back-electromotive force sinusoid. This damping signal can be introduced to the second coil to damp the second back-electromotive force sinusoid and inhibit the oscillations of the head.

14 Claims, 9 Drawing Figures

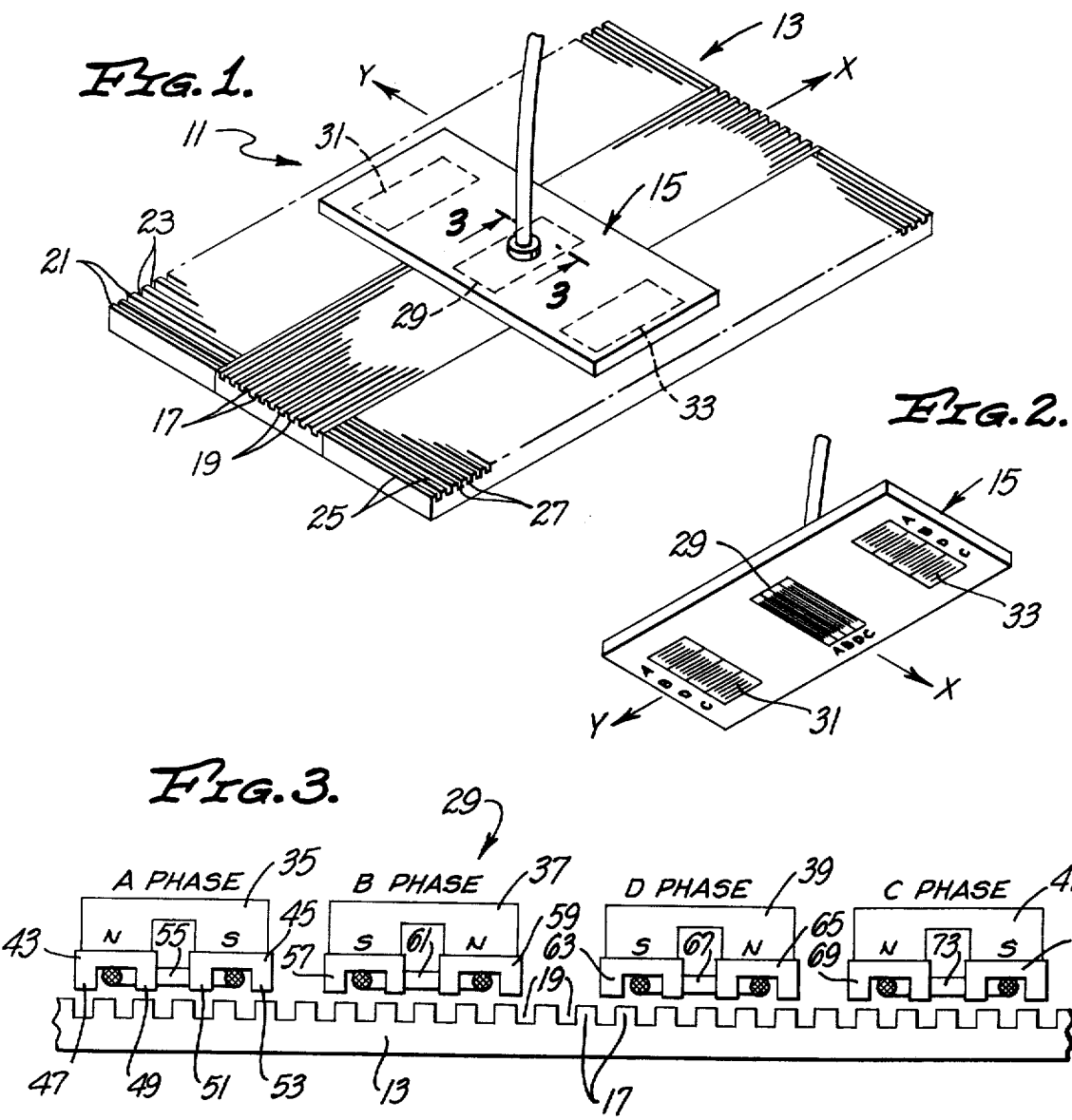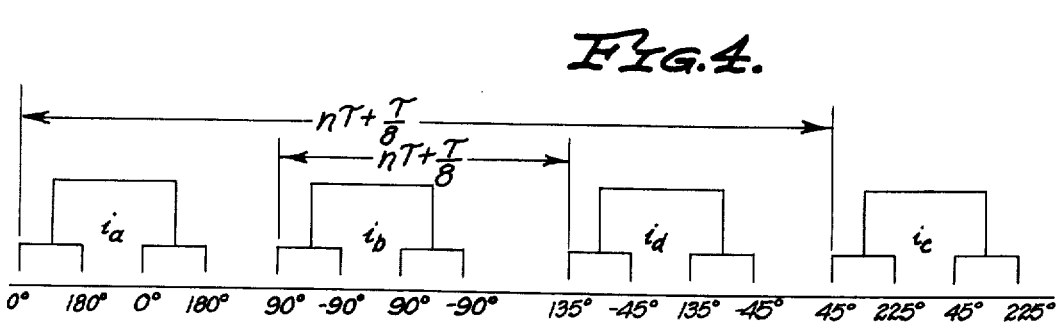

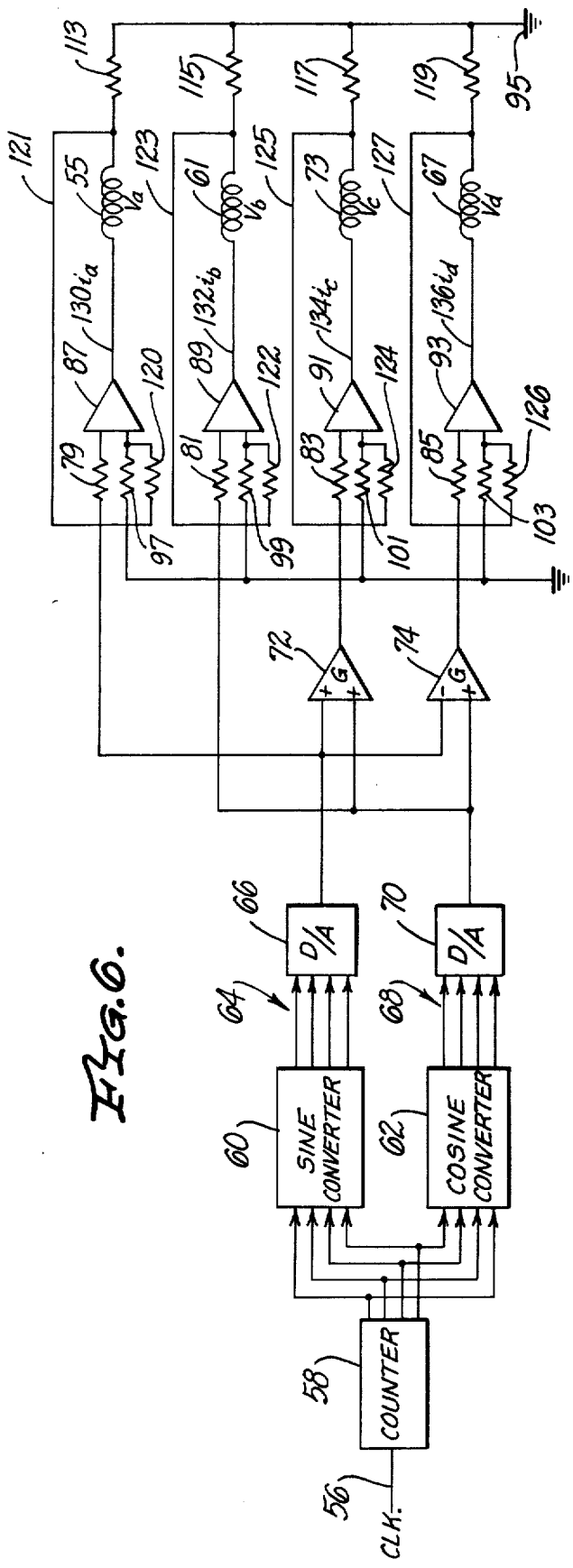
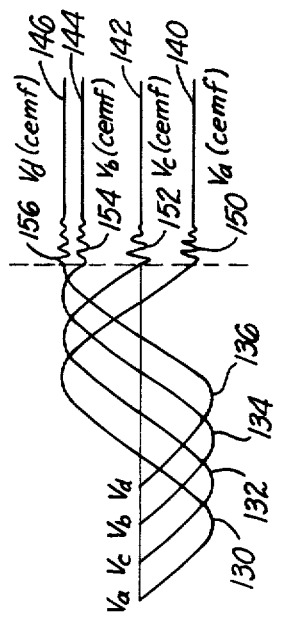
Fig.8.
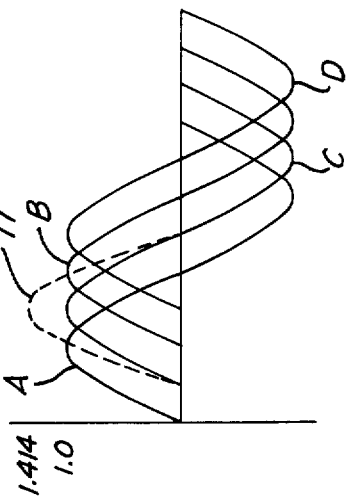
Fig.7.
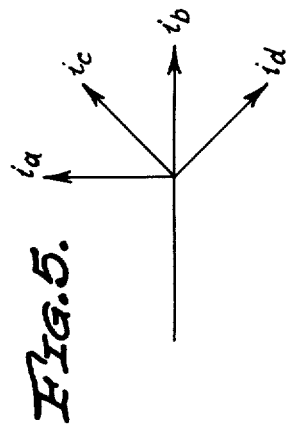
Fig.5.
Fig.6.

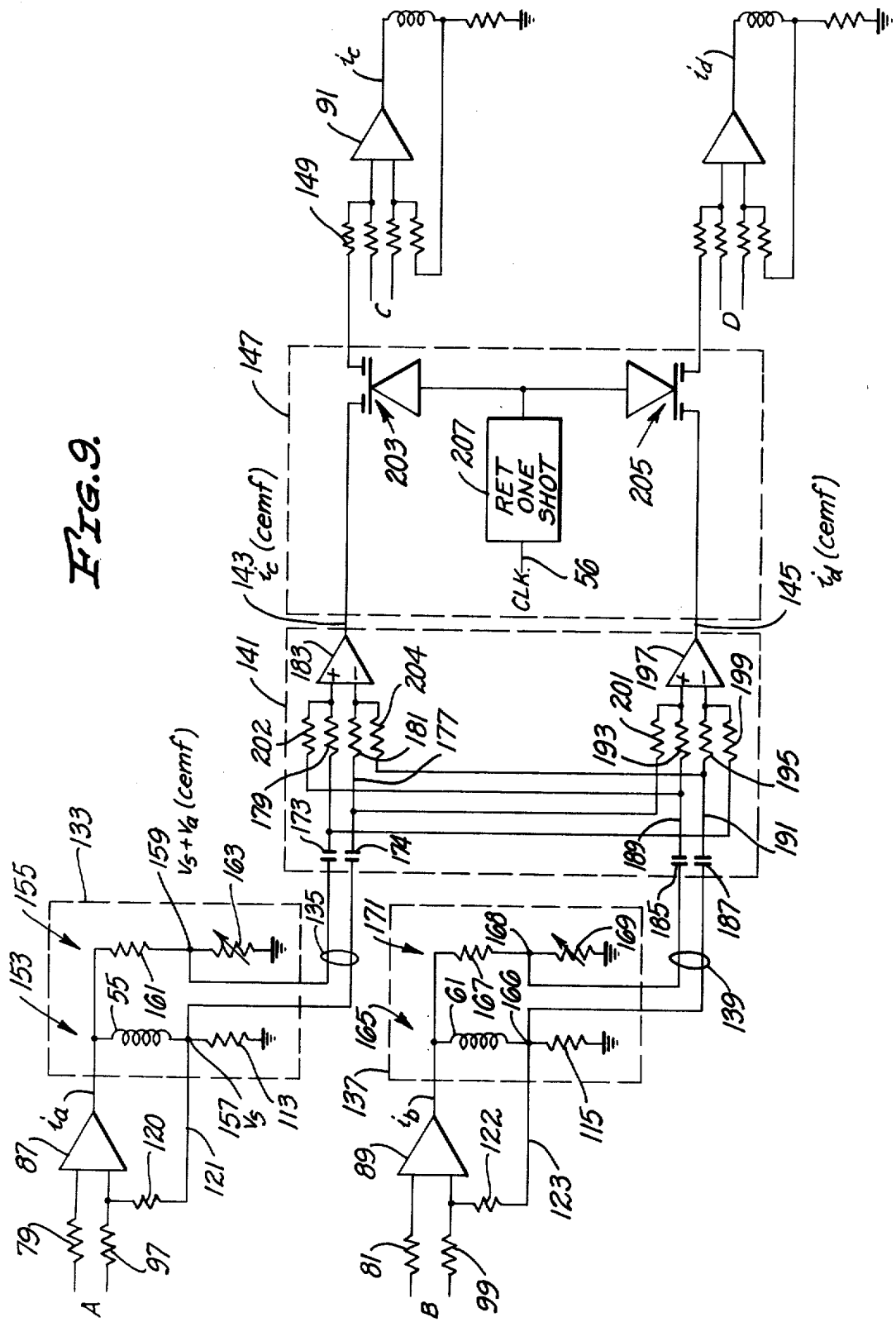

DAMPING CONTROL FOR POSITIONING APPARATUS

BACKGROUND OF THE INVENTION

1. Field of the Invention

This invention relates generally to positioning apparatus and more specifically to means providing for the controlled movement and accurate positioning of a first positioning member with respect to a second positioning member.

2. Description of the Prior Art

Positioning apparatus of the prior art have typically included a fixed member such as a platen, and a movable member, such as a head, which is independently movable with respect to the platen along X and Y axes. Thus the head can be moved and accurately positioned with respect to substantially any point on the platen.

For movement along one of the axes, the head typically includes a first drive coil which is energized by a drive signal to produce a first electromagnetic force for moving the head along the platen. Such a positioning apparatus is disclosed and claimed by Bruce A. Sawyer in his copending application Ser. No. 348,008 and by Walter E. Hinds in his copending application Ser. No. 362,119, both assigned of record to the assignee of record of the present application.

It has been found that by providing a second drive coil disposed relative to the first drive coil on the head, the second drive coil can be independently energized by a second drive signal to produce a second electromagnetic force aiding the first coil in moving the head relative to the platen. The first and second drive signals typically have a phase relationship dependent upon the relative positions of the first and second coils. In this manner the harmonics of the drive signals can be cancelled to provide an improved linear movement of the head with respect to the platen. This compensated positioning system is disclosed and claimed in application Ser. No. 438,701, filed on Feb. 1, 1974 in the name of Bernabe Nocito, which is a Continuation-in-Part of application Ser. No. 264,718, filed on June 21, 1972 in the name of Bernabe Nocito, which is presently abandoned.

The first and second drive signals have varying characteristics which provide for movement of the head relative to the platen and constant characteristics which tend to maintain the head at a fixed position with respect to the platen. When it is desired to move the head to a predetermined position on the platen, the first and second drive signals are provided with varying characteristics. When the particular point is reached, the drive signals can be changed from the varying characteristics to the constant characteristics to maintain the head at the predetermined position. Typically, the head has tended to physically ring, following abrupt transitions from the varying characteristics to the constant characteristics. The ringing of the head typically takes the form of a decaying sinusoid with a frequency dependent upon the intertial mass of the head. This decaying sinusoid may persist for as long as 200 to 500 milliseconds. The decaying oscillations of the head are particularly undesirable where the positioning apparatus is used in conjunction with a laser scriber, for example, wherein the oscillations would produce a waviness in the cut of the scriber.

SUMMARY OF THE INVENTION

In accordance with the present invention, a signal is produced in a first drive coil, and introduced to a second drive coil to damp the decaying sinusoidal movement of the head following abrupt transitions between the varying and constant characteristics of the drive signal. With this damping procedure, the oscillations of the head can be reduced to zero in approximately 20 milliseconds. Thus the head can be rapidly moved to a particular point on the platen and abruptly halted at that point to provide for the accurate positioning of an object such as a laser scriber.

In a preferred embodiment, the movement of the head relative to the platen produces a back-electromotive forces which appear as decaying sinusoids in the first and second drive coils. These back-electromotive force sinusoids are superimposed on the respective first and second drive signals. Means is provided for detecting the back-electromotive force in the first drive coil and for combining a signal representative of this back-electromotive force with the drive signal associated with the second drive coil to produce an electromagnetic force in the second drive coil which will damp the oscillation of the head.

A bridge including the first drive coil has been found particularly desirable for detecting the back-electromotive force. The bridge is particularly desirable for detecting the relatively small amplitude signal associated with the back-electromotive force in the presence of the relatively large DC voltages associated with the drive signal. The bridge is also desirable for providing a continuous signal associated with the counterelectromotive force, which has been separated from, and is thus void of, large DC voltages associated with the drive signal.

A sense resistor associated with the first drive coil can also be included in the bridge to provide a reference voltage against which the signal representative of the counterelectromotive force can be measured.

In another embodiment including four drive coils each with an independent drive signal, two of the signals can be combined in a first manner to provide the third signal and in a second manner to provide the fourth signal. Both the third and fourth signals have a particular phase characteristic with respect to the first and second signals. In such an embodiment, the back-electromotive forces associated with the first and second coils can be measured and combined in the first manner to produce a pseudo backelectromotive force in the third coil, and can be combined in the second manner to provide a pseudo back-electromotive force for the fourth coil. In such an embodiment, the damping control typically includes a phase correction network which is responsive to signals representative of first and second back-electromotive forces to produce signals representative of the back-electromotive forces associated with the third and fourth drive coils.

While the specification concludes with claims particularly pointing out and distinctly claiming the subject matter which is regarded as the invention, it is believed that the invention, together with the features and advantages thereof will be better understood from the following description taken in conjunction with the accompanying drawings.

DESCRIPTION OF THE DRAWINGS

FIG. 1 is a top perspective view of one embodiment of a head-platen combination in the positioning apparatus of the present invention;

FIG. 2 is a bottom perspective view of the head illustrated in FIG. 1;

FIG. 3 is a cross-sectional view of a magnet group in the head-platen combination taken on line 3—3 of FIG. 1;

FIG. 4 is a schematic representation of the magnet group illustrated in FIG. 3 showing the phase relationship of the magnets in a preferred embodiment of the invention;

FIG. 5 is a vector representation of the drive signals associated with the magnets illustrated in FIG. 3;

FIG. 6 is a block diagram of a network for generating the drive signals illustrated vectorally in FIG. 5;

FIG. 7 is a graph illustrating the sinusoidal characteristics of the signals A, B, C and D associated with the respective magnets illustrated in FIG. 3;

FIG. 8 is a graph illustrating signals representative of electromotive forces and signals representative of back-electromotive forces each including a decaying sinusoid; and FIG. 9 is a schematic of a preferred embodiment of a circuit for detecting the back-electromotive forces in the coils in the first order and applying them to the coils in the second order to produce the desired damping effect on the motor head.

DESCRIPTION OF PREFERRED EMBODIMENTS

A positioning apparatus is illustrated in FIG. 1 and designated by the reference numeral 11. The positioning apparatus 11 includes a platen 13 and a head 15 adapted for independent, controlled movement with respect to the platen 13. The platen 13 includes a plurality of upstanding portions or ribs 17 defining a plurality of grooves 19 extending substantially parallel to an X axis. The platen 13 also includes a plurality of ribs 21 defining a plurality of grooves 23 which extend substantially parallel to a Y axis. A plurality of ribs 25 also extend parallel to the Y axis to define a plurality of grooves 27.

As best illustrated in FIG. 2, the head 15 includes magnet groups 29, 31 and 33 associated with the ribs 17, 21, and 25, respectively, of the platen 13. The magnet group 29 provides a plurality of magnet pole faces (illustrated by the parallel lines in FIG. 2) which extend along the X axis to facilitate movement of the head 15 along the Y axis. Similarly, the magnet groups 31 and 33 have magnet pole faces which extend along the Y axis to facilitate movement of the head 15 along the X axis. By selectively energizing the magnet groups 29, 31 and 33, the head 15 can be moved to substantially any position along the platen 13 to provide for the accurate positioning of an object such as a laser scriber (not shown) which is commonly used for cutting.

This relative movement of the head 15 and platen 13 can be more easily understood with reference to FIG. 3 which illustrates in cross section the platen 13 and one of the magnet groups associated with the head 15, such as the magnet group 29. The magnet group 29 includes a plurality of magnets 35, 37, 39 and 41 which are also designated by phases A, B, D and C respectively, discussed in greater detail below.

The magnet 35 can be of the type including a pair of pole pieces 43 and 45, each having a pair of pole faces 47, 49 and 51, 53, respectively. The magnet 35 also includes a drive coil 55 which is disposed around the pole pieces 43 and 45 and adapted to be energized by a drive signal designated by the current $i_a$.

The magnets 37, 39 and 41 are similar to the magnet 35. For example, the magnet 37 includes pole pieces 57 and 59 and a drive coil 61 adapted to be energized by a drive signal designated by the current $i_b$. The magnet 39 includes pole pieces 63 and 65 and a drive coil 67 adapted to be energized by a drive signal $i_d$. Finally, the magnet 41 includes pole pieces 69 and 71 and a drive coil 73 adapted to be energized by a drive signal $i_c$.

In each of the pole pieces 43, 45, 57, 59, 63, 65, 69 and 71 the pole faces, such as the pole faces 47–53, have a particular relationship. For example, in the pole piece 43, the pole face 47 is disposed over one of the ribs 17 when the pole face 49 is disposed over one of the grooves 19. Similarly, in the pole piece 45, the pole face 51 is disposed over one of the ribs 17 when the pole face 53 is disposed over one of the grooves 19.

In each of the magnets 35, 37, 39 and 41, the pole pieces will also have a particular relationship with each other. For example, in the magnet 35, the pole piece 43 has one of its pole faces 47, 49 disposed directly over one of the ribs 17 when the pole face 45 has one of its pole faces disposed directly over one of the ribs 17. For example, as illustrated in FIG. 3, both of the pole faces 47 and 51 are disposed directly over one of the ribs 17. In the illustrated embodiment, this relationship also exists for each of the associated pair of pole pieces 57 and 59, 63 and 65, and 69 and 71.

The magnets 35 and 37 also have a particular relationship with respect to each other. When the pole faces 47 and 51 are disposed directly over the ribs 17 and the pole faces 49 and 53 are disposed directly over the grooves 19, the pole faces associated with the magnet 37 will be disposed midway between the ribs 17 and grooves 19. The pole faces associated with the magnets 39 and 41 are disposed similarly to the pole faces associated with the magnets 37 and 35, respectively. Thus it can be seen that with the pole faces of the magnet 41 disposed directly over the ribs 17 and grooves 19, the pole faces associated with the magnet 39 are disposed midway between the ribs 17 and grooves 19. Thus the magnets 35 and 37 form a set and the magnets 39 and 41 also form a set in the magnet group 29.

The set of magnets 35 and 37 is spaced from the set of magnets 39 and 41 as illustrated in FIG. 4. As disclosed by Bernabe Nocito in copending application Ser. No. 438,701, filed on Feb. 1, 1974 and assigned of record to the assignee of record of the present application, this spacing distance is given by $\eta\tau + \tau/8$. This application is a Continuation-in-Part of application Ser. No. 264,718 filed on June 21, 1972 in the name of Bernabe Nocito and since abandoned. In this equation, $\eta$ represents any whole number and $\tau$ represents the pitch of 360 electrical degrees. The additional distance of $\tau/8$ provides an increase in the equivalent phase displacement of 45° between the sets of magnets 35, 37 and 39, 41. This physical distance, in turn, corresponds with a phase displacement in the drive signals $i_a$, $i_b$, $i_c$, and $i_d$ associated with the sets of drive coils 55, 61 and 67, 73.

This phase displacement of the drive signals $i_a$, $i_b$, $i_c$ and $i_d$ is illustrated in FIG. 5. The drive signal $i_a$ is displaced 90° drive the drive signal $i_b$ and the drive signal $i_c$ is displaced 90° from the drive signal $i_d$. The drive signals $i_c$ and $i_d$ are also displaced 45° from the drive signals $i_a$ and $i_b$, respectively. These drive signals preferably have the same magnitude.

The drive signals $i_a$, $i_b$, $i_c$ and $i_d$ can be produced by a network illustrated in FIG. 6. A clock signal on a conductor 56 can be introduced to a counter 58 and the output of the counter 58 introduced to a sine converter 60 and a cosine converter 62. In response to counts from the counter 58 which increase progressively in unitary values, the sine converter 60 provides counts which define magnitudes of progressive samples of a sine wave. These counts are introduced on the conductors shown generally at 64 to a digital-to-analog converter 66 which provides a signal A having the characteristics of an analog sine wave. The signal A is associated with the magnet 35 having the A phase.

In a similar manner, the converter 62 responds to the counts of the counter 58 by providing counts representative of the magnitudes of progressive samples of a cosine wave. These counts are introduced to a digital-to-analog converter 70 on a plurality of conductors shown generally at 68. At the output of the digital-to-analog converter 70, a signal B has the characteristics of an analog cosine wave. The signal B is associated with the magnet 37 and the B phase. The relationship of the signals A and B can be more easily understood with reference to FIG. 7 wherein these signals are illustrated to have a 90° phase displacement.

A signal displaced 45° from the signals A and B can be derived by introducing the signals A and B into an operational amplifier 72. The amplifier 72 adds the two input signals A and B to provide a signal C associated with the magnet 41 and the C phase. In this particular embodiment, the signal C is interposed between the signals A and B as illustrated in FIG. 7.

In a similar manner, a drive signal D displaced 45° from the signal B can be derived by subtracting the signal A from the signal B in an operational amplifier 74. The signal D, which is associated with the magnet 39 and the D phase, is also illustrated in FIG. 7.

If the amplifier 72 were provided with a gain of unity, the signal C would have a magnitude equal to 1.414 when the signals A and B had magnitudes of unity. A signal with this magnitude is illustrated by the dotted line designated by the reference numeral 77 in FIG. 7. So that all of the drive signals have the same magnitude, the amplifiers 72 and 74 are each provided with a gain of 0.707.

The signals A, B, C and D can be introduced through input resistors 79, 81, 83 and 85, respectively, to drivers such as operational amplifiers 87, 89, 91 and 93, respectively. The operational amplifiers 87–93 can also receive a reference potential such as ground 95 through input resistors 97, 99, 101 and 103, respectively. The operational amplifiers 87–93 amplify the signals A-D along with other input signals discussed in greater detail below to produce the drive signals $i_a$, $i_b$, $i_c$ and $i_d$, respectively.

The drive signals $i_a$, $i_b$, $i_c$ and $i_d$ can be introduced through the drive coils 55, 61, 73 and 67, respectively, and a plurality of sense resistors 113, 115, 117 and 199, respectively, to the reference potential such as ground 95.

The sense resistors 113–119 provide means for limiting the current through the respective drive coils 55–67. As the current through the coils 55–67 increases, the voltage across the associated sense resistors 113–119 also increases. These voltages can be fed back on respective conductors 121, 123, 125 and 127, through respective input resistors 120, 122, 124, and 126, to those particular input terminals of the respective amplifiers 167–193 which receive the reference potential. Thus, the feedback voltage will raise the reference potential of the associated amplifier 167–193 to reduce the magnitude of the associated drive signals, $i_a$–$i_d$.

When it is desired to move the head 15 along the platen 13, the magnets in the magnet groups 29–33 are selectively energized in a particular pattern by the associated drive signals $i_a$–$i_d$. These drive signals are provided with variable characteristics to move the head 15 to a predetermined point and constant characteristics to maintain the head at the predetermined point. The voltage characteristics of the drive signals $i_a$ and $i_d$ are shown in FIG. 8 and designated $V_a$, $V_b$, $V_c$ and $V_d$ respectively.

The variable characteristics of the applied drive signal $V_a$ and $V_d$ are shown by curved lines 130 and 136, respectively. The constant characteristics of these drive signals are shown by straight lines designated by the consecutive even numerals 140 and 146, respectively. One problem associated with abrupt changes between the varying and constant characteristics of the drive signals has been that the inertia of the motor head 15 has tended to make the head 15 physically oscillate or ring following the transition. This ringing of the head 15 relative to the platen 13 has produced a decaying sinusoidal back-electromotive force in each of the respective drive coils 55, 61, 73 and 67. These decaying sinusoidal back-electromotive forces are shown generally in FIG. 8 at 156 for the drive signals $V_a$–$V_d$ signal $i_c$. These decaying sinusoids 150 and 156, which may persist for 200 to 500 milliseconds, are due primarily to the very low tangential force existing to hold the associated magnet at the predetermined position. In the past these decaying sinusoids designated in FIG. 8 by the consecutive even numerals 150–156, have had magnitudes as great as 2 millivolts and frequencies within a range of 100–120 Hertz.

The decaying sinusoids 150–156 produced by the oscillations of the head 15 appear superimposed on the DC voltage drive signals shown by the respective straight lines 140–146 applied to the associated magnet coil. The sinusoids of the back electromotive forces will be in accordance with the oscillations of the head 15 and will be present until the oscillations of the head 15 decay to zero. Oscillations of the head 15 at the predetermined position are undesirable in many applications of the positioning apparatus 11. For example, if the apparatus 11 is used to position a laser scriber (not shown), these oscillations of the head 15 would tend to produce a jagged cut at the predetermined position.

In accordance with the present invention, it was first appreciated that the head 15 and platen 13 function basically as a motor. Thus, the drive signals $i_a$–$i_d$ which are applied to the magnets in the groups 29–33 produce electromagnetic forces which tend to move the head 15 relative to the platen 13. It was then appreciated that movement of the head 15 relative to the platen 13 also induces in the associated drive coils 55, 61, 67 and 73 a backelectromotive force. This back-electromotive force appears superimposed on the electromotive force applied to the associated coil by the associated drive signal $i_a$–$i_d$. This superimposition of the signal representative of the back-electromotive force on the drive signal is also illustrated in FIG. 8 wherein a signal $V_{a(cemf)}$ illustrated by the decaying sinusoid 150 appears superimposed on the signal $V_a$ and the signal $V_{c(cemf)}$ illustrated by the decaying sinusoid 152 appears superimposed on the signal $V_c$. The signals representative of the back-electromotive force are produced only when the head 15 moves relative to the platen 13. Therefore, the signals $V_{a(cemf)}$ and $V_{c(cemf)}$ do not have the constant amplitude characteristics illustrated by the straight lines 150 and 152 in the signals $V_a$ and $V_c$, respetively.

It is known that in a motor a signal representative of back-electromotive force can be applied to the particular drive coil producing that signal to provide dynamic braking for the motor. This is typically accomplished by shorting the drive coil so that the signal representative of the backelectromotive force is fed back to the coil producing that signal. There are several reasons why this would not produce the desired effect in the positioning apparatus of the present invention. First, power must be left on the drive coils 55, 61, 73, 67 in order to maintain the head 15 in the predetermined position. This residual power is a constant characteristic of the associated drive signal as illustrated by the straight lines 140 and 142 in the signals $V_a$ and $V_c$, respectively, of FIG. 8. Shorting a particular drive coil would leave that drive coil with no power for maintaining the head 15 at the predetermined position. Another reason why this prior art procedure would not be particularly attractive in the present invention is that the drive signal has a considerably greater amplitude than would a signal representative of the back-electromotive force. For this reason, feeding back the signal representative of the back-electromotive force would not produce a significant effect in the associated drive coil.

These obstacles were overcome when it was appreciated that the decaying sinusoid in the respective drive signals have substantially the same configuration since the head 15 moves each of the magnets in a group, such as the group 29, in the same manner. Thus, in FIG. 8, the sinusoid 150 in the signal $V_a$ has substantially the same configuration as the sinusoid 152 in the signal $V_c$. It was then realized that if the oscillations in one of the signals representative of a back-electromotive force, such as the signal $V_{a(cemf)}$, could be detected, this signal could be fed back to damp the oscillations in another of the drive signals, such as the signal $V_b$. Thus a back-electromotive force associated with one of the coils, such as the coil 55, could be applied to the drive signal of another of the coils, such as coil 67, in a manner which would damp the oscillations of the head.

A preferred embodiment of a network for accomplishing this purpose is illustrated in FIG. 9. This network includes a detector 133 responsive to the drive signal $i_a$ to produce on a pair of conductors 135 the voltage $V_{a(cemf)}$ representative of the backelectromotive force in the drive coil 55. Similarly, a detector 137 is responsive to the drive signal $i_b$ to provide on a pair of conductors 139 the voltage $V_{b(cemf)}$ representative of the back-electromotive force in the drive coil 61. A phase correction network 141 is responsive to the signals on the conductors 135 and 139 to provide a signal $i_c'_{(cemf)}$ on a conductor 143 and to provide a signal $i_d'_{(cemf)}$ on a conductor 145. These signals $i_c'_{(cemf)}$ and $i_d'_{(cemf)}$ have characteristics similar to the back-electromotive forces in the respective drive signals $i_c$ and $i_a$. They are not derived from these drive signals $i_c$ and $i_d$ but rather are derived from the drive signals $i_a$ and $i_b$. For this reason they are referred to herein as psuedo counterelectromotive force signals. It is the purpose of the phase correction network 141 to provide the pseudo counterelectromotive force signals $i_c'_{(cemf)}$ and $i_d'(cemf)$ with the same phase relationship to the signals $i_{a(cemf)}$ and $i_{b(cemf)}$ that the drive signals $i_c$ and $i_d$ have to the drive signals $i_a$ and $i_b$.

The pseudo counterelectromotive force signals $i_c'_{(cemf)}$ and $i_d'_{(cemf)}$ on the conductors 143 and 145 respectively, are introduced through an inhibit network 147 and input resistors 149 and 151, respectively, to the drivers 91 and 93, respectively. In the drivers 91 and 93, these signals are combined with the input signals C and D to produce signals $i_c$ and $i_d$ which will damp the decaying oscillation of the head.

The inhibitor 147 provides means for inhibiting the pseudo counterelectromotive force signals until the varying characteristics represented by the curved lines 130-136 of the drive signals $i_a$-$i_d$ cease. Only at this time will the decaying sinusoids such as the sinusoids 150 and 152 in FIG. 8 occur; therefore, the application of the damping signal to the drive signals $i_c$ and $i_d$ is desirable only at that time.

One method of detecting the oscillations in a signal representative of a counterelectromotive force would be to couple the associated drive coil through a capacitive filter (not shown). This could, however, result in a mismatch of RC constants. Furthermore, the frequency of the decaying sinusoid in the drive signal of a particular embodiment may be in the same range of frequencies as the L/R constant of the head-platen motor combination. In that event, the detection of the decaying sinusoid would be difficult with a capacitive filter.

In a preferred embodiment of the invention, the detector 133 has the configuration of a Wheatstone bridge including a pair of branches shown generally at 153 and 155. Each of the branches 153 and 155 includes a pair of legs which define a common terminal such as the terminals 157 and 159, respectively. The branch 153 is preferably formed by the serial combination of the drive coil 55 and the sense resistor 113 associated with the magnet 35. In the other branch 155 of the detector 133, a resistor 161 is serially connected to a variable resistor 163. In a preferred embodiment, the resistor 161 has a resistance substantially equal to that of the coil 55, such as four ohms, and the resistor 163 has a resistance substantially equal to the resistance of the sense resistor 113, such as 0.5 ohms. The resistance of the resistor 163 is preferably variable to permit balancing of the bridge with fluctuations in the resistance of the coil 55.

In this embodiment, the detector 137 has a similar configuration. A branch 165 includes the drive coil 61 and the sense resistor 115 which defines a common terminal 166. A fixed resistor 167 and a variable resistor 169 define a common terminal 168 in an opposite branch 171 of the detector 137.

This bridge configuration is particularly effective for detecting the signals representative of the backelectromotive force in the coils 55 and 61. For example, in the detector 133, the same resistor 113 is in the lower leg of the head-platen motor combination and is within the respective loop of the current sources providing the signal $i_a$. For this reason, the sense resistor 113 does not see the low frequency decaying sinusoid 150 illustrated in FIG. 8.

On the other hand, the coil 55 is on the high side of the head-platen motor combination. Therefore, the coil 55 is exposed to the drive signal $i_a$ including the decaying sinusoid 129. This same signal is applied to the other branch 155 of the bridge of the detector 133. If the bridge is balanced, the voltage on the common terminal 157 will be equal to $V_s$ while the voltage on the common terminal 159 will be equal to $V_s$ plus $V_{a(cemf)}$. It is this additional voltage $V_{a(cemf)}$ which is representative of the counterelectromotive force in the coil 55. These voltages on the terminals 157 and 159 can be introduced on the conductors 135 to the phase correction network 141 where they are subtracted to produce only the voltage $V_{a(cemf)}$. In a like manner, $V_{b(cemf)}$ representative of the counterelectromotive force in the coil 61 can be detected in the detector 137.

The resistors 163 and 169 in the respective detectors 133 and 137 are provided with variable characteristics to facilitate balancing of the respective bridges. This may be particularly desirable in an embodiment wherein the coils 55, 61, 67 and 73 have different resistance values. Also, the resistance of a particular coil, such as the coil 55, will typically vary with temperature.

In the phase correction network 141, the signals on the conductors 135 can be introduced through a pair of capacitors 173 and 174, a pair of conductors 175 and 177, respectively, and a pair of input resistors 179 and 181 respectively, to an operational amplifier 183. The capacitors 173, 174 provide means for removing any additional DC components resulting from an imbalance of the bridge.

Similarly, the signals on the conductors 139 can be introduced through a pair of capacitors 185 and 187, a pair of conductors 189 and 191 respectively, and a pair of input resistors 193 and 195, respectively, to an operational amplifier 197.

The signals on the conductors 175 and 177 can also be introduced through input resistors 199 and 201, respectively, to the operational amplifier 97. Similarly, the signals on the conductors 189 and 191 can be introduced through input resistors 203 and 205 to the operational amplifier 183. With these connections, the signals on the conductors 189, 191 representative of the counterelectromotive force in the coil 61 are added to the signals on the conductors 175 and 177 representative of the counterelectromotive force in the coil 55. This summation provides the pseudo counterelectromotive force signal $V_c'_{(cemf)}$ with the same phase relationship to the signals $V_{a(cemf)}$ and $V_{b(cemf)}$ as the drive signal $i_c$ has to the drive signals $i_a$ and $i_b$. Similarly, the operational amplifier 197 provides for the subtraction of the signals on the conductors 175 and 177 representative of the counterelectromotive force in the coil 55 from the signals on the conductors 189 and 191 representative of the counterelectromotive force in the coil 61. This subtraction provides the psuedo counterelectromotive force signal $V_d'_{(cemf)}$ with the same relationship to the signal $V_{a(cemf)}$ and $V_{b(cemf)}$ as the drive signal $i_d$ has to the drive signals $i_a$ and $i_b$.

The inhibitor 147 can include a field-effect transistor 203 providing a switching means in the conductor 143, and a field-effect transistor 205 providing a switching means in the conductor 145. The conductor 56, also illustrated in FIG. 6, can introduce clock pulses to a retriggerable one-shot 207 which has a time period greater than that of the clock pulses. Thus, as long as the pulses appear on the conductor 56, the retriggerable one-shot 207 will maintain a high level providing the field-effect transistors 203 and 205 with open circuit characteristics. Clock pulses on the conductor 56 are associated with the varying characteristics such as those shown by the curved lines 130 and 132 in FIG. 8. When the clock pulses cease, the A phase signal and B phase signal are provided with their constant characteristics represented by the straight lines 140 and 144 in FIG. 8. It is at this moment of transition that it is desirable to damp the decaying sinusoids 150 and 152 as previously discussed. Thus, with the ceasing of the clock pulses on the conductor 56, the retriggerable one-shot will time out to provide a low level signal which will provide the transistors 203 and 205 with closed circuit characteristics.

It follows that at this moment of transition, the pseudo back-electromotive force signal $i_c'_{(cemf)}$ from the amplifier 193 will be introduced to the driving amplifier 91 through the input resistor 49. In the amplifier 91, this signal $i_c'_{(cemf)}$ will be applied to the drive signal $i_c$ to provide for a sharp transition between the variable characteristics represented by the line 132 and the constant characteristics represented by the line 142.

At the same instant, the signal $i_d'_{(cemf)}$ will be introduced through the input resistor 151 to the driver amplifier 93 to damp the decaying sinusoid by its application to the drive signal $i_d$. With sharp transitions between the variable characteristics and constant characteristics in the drive signals $i_c$ and $i_d$, the oscillations of the head 15 with respect to the platen 13 will also be inhibited. Ultimately, this will mean that the object positioned by the head 15, such as a laser scriber (not shown), will be rapidly moved to the predetermined point where it will be substantially immediately held in a fixed relationship with the platen 13. With the damping control of the present invention, the decaying sinusoids associated with the respective drive signals can be damped in approximately twenty milliseconds or approximately 2 cycles of a 10 milliseconds per cycle signal.

Although the invention has been disclosed with reference to an embodiment providing for applying a damping signal to both the drive signals on $i_c$ and $i_d$, it will be apparent to those skilled in the art that the advantages associated with the invention ccan be achieved by applying a similar damping signal to only one of the drive signals, such as the signal $i_c$. The oscillations of the head 15 are more rapidly damped however when damping signals are applied to both the drive signals $i_c$ and $i_d$. It will also be appreciated that pseudo back-electromotive force signals could be derived from the drive signals $i_c$ and $i_d$ and appropriately phase corrected to produce pseudo backelectromotive force signals $V_a'_{(cemf)}$ and $V_b'_{(cemf)}$ for damping the decaying sinusoids 150 and 514 in the respective signals to drive signals $i_a$ and $i_b$. In an embodiment wherein the magnets 35 and 37 have the same phase relationship as the magnets 39 and 41, the phase correction network can be entirely eliminated.

Although the invention has been described with reference to specific embodiments, it will be appreciated by those skilled in the art that the invention can be otherwise embodied. For this reason, the scope of the invention should be ascertained only with reference to the following claims.

I claim:
1. A positioning apparatus including:
   a first member forming a platen;
   a second member adapted for controlled independent movement with respect to the first member;
   a first coil carried by the second member and adapted to respond to a first electromagnetic force to position the second member with respect to the first member;

a second coil carried by the second member and disposed relative to the first coil, the second coil being adapted to respond to a second electromagnetic force to aid the first coil in positioning the second member with respect to the first member;

the first and second electromagnetic forces having variable characteristics for moving the second member relative to the first member and having constant characteristics for maintaining the second member at a predetermined point relative to the first member;

the second member having inertia characteristics for physically oscillating about the predetermined point following abrupt transitions from the variable to the constant characteristics of the first and second electromagnetic forces;

the first coil being responsive to the oscillating of the second member relative to the first member to produce in the first coil a first signal representative of a back-electromotive force in the first coil;

the second coil being responsive to the oscillating of the second member relative to the first member to produce in the second coil a second signal representative of a back-electromotive force in the second coil;

means for detecting the signal representative of the backelectromotive force in the first coil for producing a damping signal; and means for introducing the damping signal to the second coil to damp the second signal representative of the backelectromotive force in the second coil and thereby inhibit the oscillating of the second member relative to the first member.

2. The positioning apparatus recited in claim 1 wherein the first coil has a predetermined spaced relationship with respect to the second coil and the detecting means includes:

a phase correction network responsive to the first signal representative of the back-electromotive force in the first coil to adjust the phase of the first signal in accordance with the predetermined phase relationship of the first and second coils to produce the damping signal.

3. The positioning apparatus recited in claim 1 wherein the introducing means includes means for inhibiting the damping signal when the first and second electromagnetic forces have the variable characteristics.

4. The positioning apparatus recited in claim 1 wherein:

the detecting means includes a bridge network having a pair of branches each including a pair of legs with a common terminal;

the first coil is disposed in one of the legs of one of the branches;

resistance means is disposed in the other legs of the branches; and the signal representative of the counterelectromotive force is measured across the common terminals of the bridge network.

5. The positioning apparatus recited in claim 4 further comprises:

a sense resistor serially coupled to the first coil and having properties for limiting the magnitude of the first electromotive force, the sense resistor included in the resistance means and being connected in the other of the other of the legs in the one branch.

6. A positioning apparatus including:

a platen;

a head adapted for movement with respect to the platen;

means for providing a first drive signal and a second drive signal, the first and second drive signals having varying characteristics and constant characteristics;

a first coil included in the head and being responsive to the varying characteristics of the first drive signal for moving the head relative to the platen, and being responsive to the constant characteristics of the first drive signal to maintain the head and the platen in a substantially fixed relationship;

a second coil included in the head and being responsive to the varying characteristics of the second drive signal for aiding the first coil in moving the head relative to the platen, and being responsive to the constant characteristics of the second drive signal for aiding the first coil in maintaining the head and the platen in a substantially fixed relationship;

the head having properties producing oscillations of the head following an abrupt transition from the variable to the constant characteristics of the first and second drive signals;

the oscillations of the head relative to the platen producing a back-electromotive force providing in the first coil a particular signal having characteristics dependent upon the characteristics of the back-electromotive force;

first means responsive to the particular signal in the first coil for providing a damping signal having characteristics dependent upon the oscillations of the head; and second means for intoducing the damping signal to the second coil to damp the oscillations of the head relative to the platen.

7. The positioning apparatus recited in claim 6 wherein the first and second coils have a particular phase relationship and the second means comprises:

third means responsive to the particular signal for varying the phase of the particular signal in accordance with the particular phase relationship of the first and second coils to provide the damping signal; wherein the second means introduces the damping signal to the second coil and the second coil produces an electromagnetic force opposing the oscillations of the head to dampen the oscillations of the head.

8. The positioning apparatus recited in claim 6 wherein the second means comprises:

third means responsive to the damping signal for inhibiting the damping signal when the first and second drive signals have the varying characteristics; and fourth means coupled to the third means and responsive to the damping signal from the third means for combining the damping signal and the second drive signal to provide a combined signal and for introducing the combined signal to the second coil to damp the oscillations of the head.

9. A positioning system for providing a control relative movement between two members along at least a first axis, comprising:

a first member forming a platen having a first energy configuration;

a second member disposed relative to the first member for independent movement relative to the first member along the first axis;

first means carried by the second member and being selectively energizable to provide the second member with a second energy configuration tending to move the second member relative to the first member along the first axis, and being selectively energizable to provide the second member with a third energy configuration tending to maintain the second member in a substantially fixed relationship with the first member;

the second member tending to oscillate with the abrupt changes between the second energy configuration and the third energy configuration of the first means;

second means coupled to the first means and being responsive to the oscillations of the second member with respect to the first member to produce a particular signal having characteristics dependent upon the oscillations of the second member; and third means carried by the second member and being responsive to the particular signal from the second means to provide the second member with a fourth energy configuration tending to inhibit the oscillations of the second member.

10. The positioning system recited in claim 9 wherein the first means includes a drive coil and the second means includes:

a plurality of legs forming a bridge network having a pair of branches each including a common terminal defined by a pair of the legs;

the drive coil being disposed in one of the legs of one of the branches; and means coupled to the common terminals of the branches to provide the particular signal.

11. The positioning system recited in claim 10 wherein the drive coil in the first means is selectively energizable by a drive signal and the apparatus further comprises:

a sense resistor serially connected to the drive coil in the first means and having properties for reducing the magnitude of the drive signal, the same resistor being included in the second means in the other of the legs of the one branch.

12. A positioning apparatus providing a controlled relative movement between two members along at least a first axis, comprising:

a first member forming a platen;

a second member forming a head and being independently movable with respect to the first member;

a first drive coil carried by the second member and being selectively energizable by a first drive signal having variable characteristics tending to move the second member relative to the first member along the first axis and having constant characteristics tending to maintain the second member in a fixed relationship with the first member;

a second drive coil carried by the second member and being selectively energizable by a second drive signal having variable characteristics tending to move the second member relative to the first member along the first axis and having constant characteristics tending to maintain the second member in a fixed relationship with the first member;

a third drive coil carried by the second member and being disposed in a particular phase relationship to the first and second drive coils, the third drive coil being selectively energizable by a third drive signal having the particular phase relationship to the first and second drive signals to move the second member relative to the first member along the first axis;

the second member having properties for oscillating relative to the first member in response to transitions between the variable characteristics and the fixed characteristics of the first and second drive signals;

the first drive coil being responsive to the oscillating of the second member to produce a fourth signal having characteristics dependent upon the oscillating of the second member;

the second drive coil being responsive to the oscillating of the second member to produce a fifth signal having characteristics dependent upon the oscillating of the second member;

first means responsive to the first signal from the first drive coil and the second signal from the second drive coil for producing a sixth signal having characteristics dependent upon the oscillating of the second member and having the particular phase relationship to the fourth signal and the fifth signal; and second means for introducing the sixth signal to the third drive coil to energize the third drive coil to inhibit the oscillations of the second member relative to the first member.

13. The positioning apparatus recited in claim 12 further comprising a sense resistor serially connected to the first drive coil and having characteristics for reducing the magnitude of the first drive signal.

14. The positioning apparatus recited in claim 13 wherein the first means comprises:

bridge means including the first drive coil and the sense resistor, for detecting the fourth signal in the first drive coil.

* * * * *